Aug. 29, 1967     W. HOVERMAN, JR     3,338,015
SEALING STRIP
Filed Sept. 7, 1965
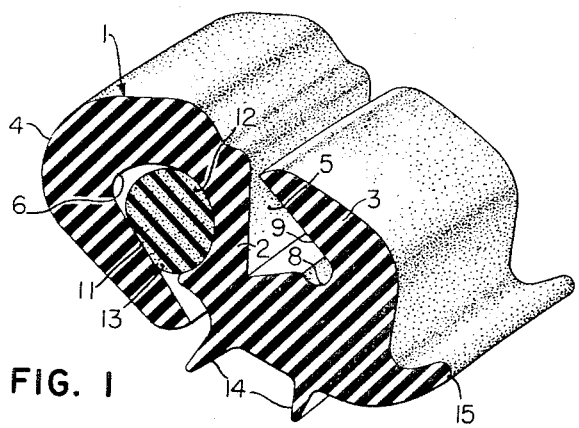
FIG. 1
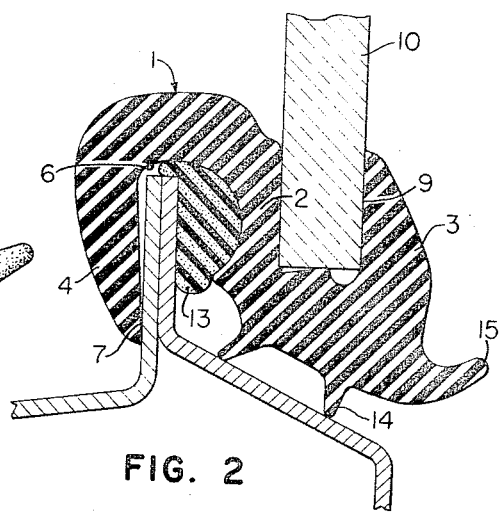
FIG. 2
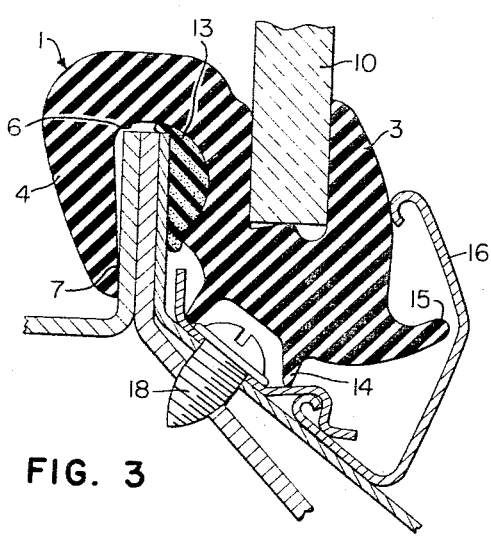
FIG. 3
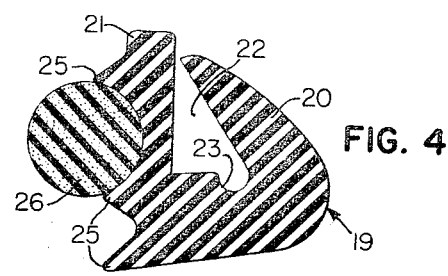
FIG. 4
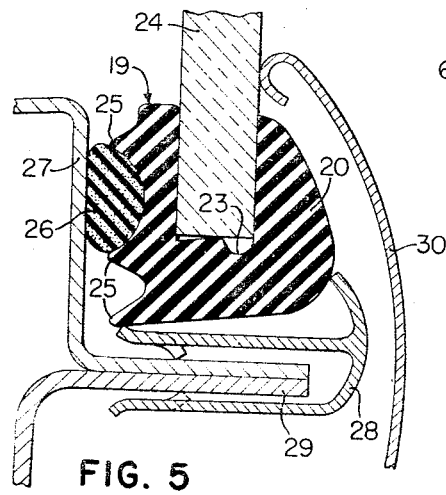
FIG. 6
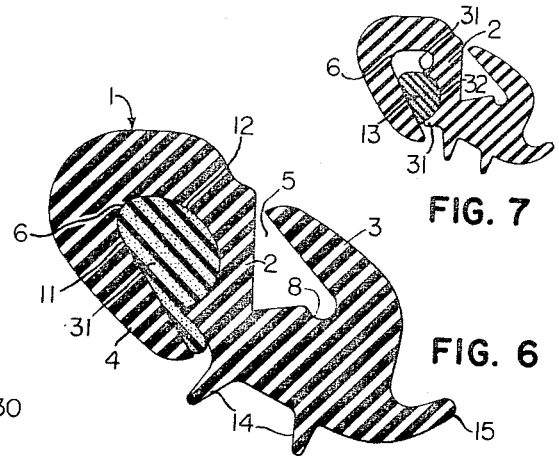
FIG. 5
FIG. 7
INVENTOR.
WILLIAM HOVERMAN, JR.
BY
*J.B. Holden*
ATTORNEY

United States Patent Office 3,338,015
Patented Aug. 29, 1967

3,338,015
SEALING STRIP
William Hoverman, Jr., St. Marys, Ohio, assignor to The Goodyear Tire & Rubber Company, Akron, Ohio, a corporation of Ohio
Filed Sept. 7, 1965, Ser. No. 485,255
5 Claims. (Cl. 52—400)

This invention relates to mounting strips of elastomeric material such as rubber or rubber-like materials especially adapted for mounting glass panes or other panels or sheet material into window openings so as to provide a cushioning seal between the glass or panel and its connected support. Sealing strips of this type are frequently used to mount windshields or rear deck windows in automotive vehicles and the like.

The prior art shows various configurations of elastomeric strips used to join two sheet-like members as in the case of mounting a windshield in a vehicle windshield opening. The typical sealing strip used has a plurality of lips defining two opposed longitudinal grooves or channels. One of these channels is designed to receive a pane of glass and the other channel receives the sheet metal flanges forming a window frame. These flanges are often referred to as a pinchweld or fence.

Various attempts have been made to design the seal strip to create a leak-proof seal between the strip and the joining panels. Due to the curvature of the panels and the variation in tolerance in the panels, it has been necessary to supplement the sealing action of the seal strip against the panels by coating the inside surfaces of the panel receiving channels with a putty-like caulking compound sometimes referred to as "gunk." This sealing method has not been satisfactory since it is messy to apply and over a period of time seeps out and smears the windows. Sometimes this compound collects grit which is picked up by the windshield wipers and causes small scratches in the windshield.

Some of the previously used sealing strips create a seal by the use of auxiliary wedging strips forced into a longitudinal groove to force the lips on the seal strip to close upon the panels to be joined. The use of wedging strips has not been entirely satisfactory since it complicates the design of the sealing strip by requiring an extra groove therein and it also necessitates the manufacture of an extra part.

Other of the previously used sealing strips have a plurality of integral sealing fins located in the channels which receive the glass or the window pane. These have not been entirely satisfactory since only a limited portion of the channel is in sealing contact with the glass or window frame which is inserted therein.

It is a primary object of this invention to eliminate the need for a putty-like sealing compound inside the panel receiving channels by providing a seal strip, the inherent design of which creates a leak-proof seal merely by the contact of the sealing strip with the parts being joined.

Another object of this invention is to provide a sealing strip which is simple in design, inexpensive to manufacture and which is easy to install and can be readily removed to replace broken windows.

A further object of this invention is to provide a panel which eliminates the need for wedging strips to force the channel lips into sealing engagement with the panels.

Another object of the invention is to eliminate the need for sealing fins in the channels of the seal strip.

Still another object of the invention is the provision of a seal strip which readily adjusts to the variations in tolerance of the panels to be joined.

Still a further object of the invention is to provide a seal strip in which a larger effective sealing area is in contact with the panels at all times.

These and other objects of the invention will appear more fully in the following specifications and the accompanying drawings in which:

FIG. 1 is a cross-sectional view in perspective of a sealing strip in its normal unstressed shape prior to assembly with a windshield mounted in a vehicle window opening;

FIG. 2 shows a section of the seal strip of FIG. 1 after assembly and connecting the marginal edges of a pane of glass to the marginal edge of a sheet metal support such as a window opening in an automotive vehicle;

FIG. 3 is similar to FIG. 2 but shows a trim strip installed on the outside of the seal strip;

FIG. 4 shows a cross-section of another embodiment of the seal strip in its normal unstressed position;

FIG. 5 shows the strip of FIG. 4 after assembly with a pane of glass in a window opening and with a trim strip mounted on the outside of the seal strip;

FIG. 6 shows a cross-section of another embodiment of the invention; and

FIG. 7 shows a cross-section of another embodiment of the invention.

Referring now more specifically to the drawings, and in particular to FIGS. 1 and 2, the numeral 1 indicates generally the sealing strip or body portion of the invention. For the purpose of illustrating the invention a windshield is shown mounted in the seal strip, however rear decks or other windows or panels may also use the seal strip. The cross section of the sealing strip 1 is of irregular contour and resembles a modified S curve. The seal strip 1 is preferably an extrusion of resilient elastomeric material such as rubber or the like. It may, however, be molded, cast or made by any other manufacturing method. The seal strip 1 has a continuous longitudinal intermediate portion 2 which has an integral lip 3 extending from one side thereof and a similar lip 4 extending from the opposite side thereof. The lip 3 is spaced from the intermediate portion 2 and defines a glass receiving channel 5 therebetween. The lip 4 is spaced from the intermediate portion 2 and defines a channel 6 therebetween which receives a window frame 7 (shown in FIG. 2) of a vehicle window opening. The window frame 7 is of the typical pinch weld construction used on many vehicle bodies. It consists of a welded metal flange which forms a portion of a vehicle body. Both the channels 5 and 6 are substantially closed at their outer extremities when the seal strip 1 is in its normal unstressed extruded form prior to assembly, and the glass receiving channel 5 is narrower than the thickness of the glass to be placed therein. The width of the channels 5 and 6 depends upon the thickness of the part which is fit into them since the channels adjust to fit the part.

A continuous longitudinal breaker groove 8 is located along the base of the channel 5 at the junction with lip 3 to provide greater flexibility to the lip 3 at said channel base and thereby facilitate opening the lip 3 to receive a window pane without substantial bending of the lip 3, thereby providing greater surface contact between the flat inner face 9 of the lip 3 and a window pane 10 of glass or other sheet material that is inserted therein. The breaker groove 8 permits the channel 5 which, before insertion of the glass, is narrower than the thickness of the glass 10 to open wider to receive the glass and provide a snug fit therewith. To further increase the surface contact between the inner face 9 and the window pane 10, the lip 3 is thickest at the base portion and tapers to a thinner cross section at its outer extremity so that even when the outer extremity of the lip is pulled away from the window pane 10 the base portion of the lip 3, because of its thickness, will still remain in sealing contact therewith.

The inner surface 11 of the lip 4 is substantially flat and is opposite a curved surface 12 on the intermediate portion 2. This results in the channel 6 having a curved side and a flat side. A continuous strip 13 of resilient cellular material such as butyl sponge, ethylene propylene terpolymer, urethane foam neoprene or other suitable material is adhered to the curved surface 12 of the channel 6 by any suitable adhesive. The strip 13 should be made of moisture proof material which is more resilient that the sealing strip 1 yet of sufficient stiffness to exert pressure against a panel member or window frame inserted in the channel 6 between the strip 13 and the lip 4, and provide a leak-proof seal between the seal strip 1 and the frame 7. In some seal strip assemblies, the strip 13 may be hollow to provide greater resiliency. When assembled the edge of the window pane 10 lies outwardly from the edge of the window frame 7. The resiliency of the strip 13 and the deflection of the intermediate portion 2 compensates for variations in tolerance of the spacing between the window frame 7 and the window pane 10 to provide a continuous seal along the entire length of the seal strip 1. The seal strip 1 in the embodiment shown in FIGS. 1, 2 and 3 has a pair of tapered fins 14 along its lower surface, and a forwardly extending curved fin 15 along the front thereof. The fins 14 are used on the seal strip 1 when additional thickness is required in the seal strip wall at the base of window channel 9 to make proper surface contact with certain designs of window frames and to compensate for irregularities and variations of the window and frame. When the seal strip is used with some window frames, the fins 14 are not needed.

On some seal strips it is useful to have a curved fin such as the fin 15 to break up the air flow across the seal strip and reduce wind noise. Such a fin is not needed on all seal strips but is more useful on a seal strip which is used to mount the front windshield in a vehicle window frame where there is exposure to high wind velocities.

Referring now to FIG. 2, it will be seen that when the window pane 10 is inserted in the channel 5 the lip 3 is bent outward from its normally closed position. With the window pane inserted in the channel 5 the lip 3 applies constant pressure against the window pane 10 thereby gripping it between the lip 3 and the intermediate portion 2 with the inner face 9 of the lip 3 lying flat against the edge of the window pane 10 to form a leak-proof seal between the window pane 10 and the seal strip 1. Similarly, when the seal strip 1 is placed on the window frame 7 the lip 4 is bent outwardly from its normally closed position and then allowed to close against one surface of the window frame 7 to sealingly grip the frame 7 between the lip 4 and the butyl sponge strip 13.

It will be seen that since both the channels 5 and 6 must be flexed from their normally substantially closed position to receive the parts inserted therein, a built-in tension is created which continually holds both the window pane channel lip 3 and the window frame channel lip 4 tightly against the objects inserted therein. The breaker groove 8 in conjunction with the tapered design of the lip 3 provides a cross sectional design which is sufficiently flexible to adjust to different glass tolerances and yet maintain the inner face of the lip 3 in flat sealing contact with the glass. The seal created in this manner makes it unnecessary to coat the inner surface of the channels with a putty-like sealing compound which has usually been necessary in the past.

In FIG. 3 the seal strip 1 is the same as that shown in FIG. 2 except that a chrome trim strip 16 is positioned over the front of the seal strip 1 and is fastened to an automobile body by a spring clip 17 held in place by a screw 18.

Another embodiment of this invention is shown in FIG. 4 in which an elastomeric seal strip 19 is of a substantially U-shape configuration and has a tapered outer lip 20 and an irregular shaped intermediate portion 21 defining therebetween a window pane receiving channel 22 which, before the insertion of the window pane, is narrower than the glass thickness. When the seal strip 19 is mounted in a window frame with a window pane, the intermediate portion 21 lies between the pane of glass and the window frame. The channel 22 has a continuous longitudinal breaker groove 23 along the base thereof similar to the breaker groove 8 in FIGS. 1 and 2. The breaker groove 23 provides flexibility for bending the lip 20 outwardly to receive a pane of glass 24 (FIG. 5) in the same manner that the breaker groove 8 provides flexibility for lip 3 in FIG. 1. The lip 20 is thickened at the base portion and tapers to a thinner cross section at its outer extremity. This configuration provides maximum surface contact between the lip 20 and the window pane 24 to create a seal with the channel 22 in the same manner that the window pane 10 is held by channel 5 in FIG. 2. The intermediate portion 21 has a plurality of rearwardly facing fins 25 between which is mounted a strip 26 of butyl sponge material.

As shown in FIG. 5, the strip 26 is compressed between the seal strip 1 and a portion of a window frame 27 to provide a seal therebetween. In FIG. 5 the seal strip 19 is held in position against the window frame 27 by a series of spring clips 28 which attach to a pinch weld type flange 29 one part of which is integral with the window frame 27. When the seal strip 19 is fastened to the window frame 27 the strip 26 is compressed therebetween to provide a weatherseal without the use of additional sealing compound. This embodiment is used on window openings which eliminate a pinch weld in the area of contact with the seal strip. An outside chrome trim strip 30 is mounted on the outside of the seal strip 19 and is attached by suitable means (not shown) to the window frame.

In FIG. 6 a pinch weld receiving channel 6 is filled with a continuous strip of cast-in-place resilient urethane foam 31 which serves the same sealing function as the butyl sponge strip 13 in FIGS. 1, 2 and 3. A pinch weld inserted into the channel 6 would be gripped between the inner face 11 of the lip 4 and the foam 31 in the same manner as the pinch weld frame 7 in FIGS. 2 and 3. The strip 31 may be adhered to the curved surface 12 of the channel 6 by any suitable adhesive or it may be held in place merely by the contour of the channel 6.

The embodiment shown by the smaller scaled view in FIG. 7 is similar to that shown in FIGS. 1 through 3 except that the strip 13 is positioned lower in the window frame channel 6 to accommodate certain types of pinch welds. To locate the strip 13 at the desired position in the channel 6, a pair of longitudinal fins 31 extend rearwardly from the intermediate portion 2. The fins 31 are spaced apart to form an arcuate groove 32 therebetween into which the strip 13 is placed. The fins 31 aid in preventing the strip 13 from being forced out of sealing position by the pinch weld when the seal strip 1 is positioned thereon.

In either the embodiment shown in FIGS. 1 through 3 or the embodiment shown in FIGS. 4 and 5, the use of a tapered lip having a flat inner face in conjunction with a breaker groove such as 8 or 23 are some of the most significant features of the invention. This configuration provides maximum sealing surface contact of the seal strip with the glass pane and sufficient flexibility of the seal strip to adjust to variations in tolerance of the glass and window frame thickness and to variations in the spacing between the edges of the glass and the window frame.

Another significant feature of the invention is the use of the resilient sponge-like material as a seal between the seal strip and the window frame. The resilient material can be butyl sponge, ethylene propylene terpolymer, urethane foam, neoprene or any moisture proof material which is more resilient than the main body of the seal strip but of sufficient stiffness to exert pressure against the member being sealed in the channel. The sealing characteristics of this invention eliminate the need for putty-like sealing compound which is ordinarily used in the glass and pinch weld channels of most seal strips.

While certain representative embodiments and details have been shown for the purpose of illustrating this invention, it will be apparent to those skilled in the art that various changes and modifications may be made therein without departing from the spirit or scope of the invention.

What is claimed is:

1. A sealing strip having an elongated elastomeric body portion of uniform cross section for mounting a window pane in a window frame comprising:
   (A) an intermediate portion having a substantially flat surface along the length thereof,
   (B) at least one longitudinal integral lip extending therefrom with a substantial portion of the lip spaced from said intermediate portion and defining a window pane receiving channel therebetween, the inner face of the lip being a flat surface located on the opposite side of the channel from the flat surface on the intermediate portion,
   (C) a longitudinal breaker groove in the bottom of the channel at the junction of the lip and the intermediate portion to permit the lip to be opened easily to receive the edge of the window pane with the inner face of the lip retaining a substantially flat contour to provide maximum sealing surface contact with the window pane,
   (D) said lip being thicker at the base portion adjacent the breaker groove and uniformly tapering to a thinner cross section at its outer extremity, thereby providing greater flexibility at the outer extremity than at the base so that if the outer extremity of the lip is pulled away from the window pane in the channel, the base portion of the lip will still remain in sealing contact therewith,
   (E) the breaker groove and the tapered configuration of the lip resiliently cooperating to provide width adjustment of the window pane receiving channel while retaining both flat sides of the channel in intimate sealing contact with the window pane inserted therein, and
   (F) a strip of sealing material which is softer than the body portion located on the intermediate portion on the opposite side thereof from the flat surface which faces the window pane receiving channel, said strip located between said intermediate portion and the window frame to provide a leakproof seal therebetween.

2. The sealing strip of claim 1 wherein said sealing material is a strip of sponge-like material positioned between a pair of longitudinal fins which extend rearwardly from the intermediate portion.

3. The sealing strip of claim 2 wherein the strip of sponge-like material is ethylene propylene terpolymer.

4. The sealing strip of claim 2 wherein the strip of sponge-like material is butyl sponge.

5. The sealing strip of claim 1 including a second longitudinal lip integral with the side of the intermediate portion opposite the first lip and defining therebetween a window frame receiving channel facing in the opposite direction from the window pane receiving channel, said channels lying in offset planes from each other so that when the margins of the window pane and the window frame are placed in their respective channels, said margins will lie in overlapping relationship to each other, separated by the intermediate portion and with the window pane sealingly gripped between the first lip and the intermediate portion and the window frame sealingly gripped between the second lip and the intermediate portion.

References Cited

UNITED STATES PATENTS

| | | | |
|---|---|---|---|
| 2,497,276 | 2/1950 | Scott et al. | 52—400 X |
| 2,762,475 | 9/1956 | Bowden | 52—400 X |
| 2,784,926 | 3/1957 | Bonza et al. | 52—400 X |
| 3,037,810 | 6/1962 | Kelley | 52—400 X |
| 3,061,895 | 11/1962 | Kleinhans | 52—400 |
| 3,105,274 | 10/1963 | Armstrong | 52—398 |
| 3,107,939 | 10/1963 | Meyer | 52—400 X |
| 3,230,677 | 1/1966 | Brown | 52—400 X |

DAVID J. WILLIAMOWSKY, *Primary Examiner.*

HARRISON R. MOSELEY, *Examiner.*

D. L. TAYLOR, *Assistant Examiner.*